United States Patent
Hasegawa

(10) Patent No.: US 11,909,926 B2
(45) Date of Patent: Feb. 20, 2024

(54) INFORMATION PROCESSING APPARATUS USING CLOUD, CONTROL METHOD THEREFOR, STORAGE MEDIUM STORING CONTROL PROGRAM THEREFOR, AND INFORMATION PROCESSING SYSTEM, THAT OBTAIN AND STORE ADDITIONAL PRINT SETTING INFORMATION NOT INCLUDED IN A TENANT SERVER THAT STORES PRINT SETTING INFORMATION

(71) Applicant: CANON KABUSHIKI KAISHA, Tokyo (JP)

(72) Inventor: Kiichi Hasegawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/880,753

(22) Filed: Aug. 4, 2022

(65) Prior Publication Data
US 2023/0062471 A1    Mar. 2, 2023

(30) Foreign Application Priority Data

Aug. 30, 2021    (JP) .................... 2021-140061

(51) Int. Cl.
*H04N 1/00*    (2006.01)
*H04L 51/046*    (2022.01)

(52) U.S. Cl.
CPC ....... *H04N 1/00212* (2013.01); *H04N 1/0097* (2013.01); *H04N 1/00217* (2013.01);
(Continued)

(58) Field of Classification Search
None
See application file for complete search history.

(56) References Cited

U.S. PATENT DOCUMENTS 10,652,178 B2    5/2020    Takishima et al.
10,917,369 B2    2/2021    Takishima et al.
(Continued)

FOREIGN PATENT DOCUMENTS

JP    2018128843 A    8/2018

*Primary Examiner* — Henok Shiferaw
(74) *Attorney, Agent, or Firm* — ROSSI, KIMMS & McDOWELL LLP

(57) ABSTRACT

An information processing apparatus that allows unique setting of an image processing apparatus even when print is instructed from a cooperation application. The information processing apparatus is connected to the image processing apparatus, a tenant server that holds machine information including first setting information about the image processing apparatus, and a user terminal. The information processing apparatus includes a message application, a cooperation application that controls the image processing apparatus to print in cooperation with the message application by using the machine information, a memory device that stores instructions, and a processor that executes the instructions to obtain the first setting information from the image processing apparatus, store the first setting information to the tenant server, obtain second setting information that is not included in the machine information from the image processing apparatus, and store the second setting information to a storage unit in association with the machine information.

16 Claims, 15 Drawing Sheets

(52) U.S. Cl.
CPC ..... *H04N 1/00233* (2013.01); *H04N 1/00244* (2013.01); *H04N 1/00938* (2013.01); *H04N 1/00973* (2013.01); *H04L 51/046* (2013.01); *H04N 2201/0094* (2013.01)

(56) References Cited

U.S. PATENT DOCUMENTS

| | | | |
|---|---|---|---|
| 2017/0308337 A1* | 10/2017 | Yanagi | G06F 3/1203 |
| 2018/0227251 A1* | 8/2018 | Takishima | H04L 51/04 |
| 2019/0369924 A1* | 12/2019 | Oka | H04L 51/02 |
| 2020/0099728 A1* | 3/2020 | Haruta | H04L 51/52 |
| 2021/0409556 A1* | 12/2021 | Ushinohama | H04L 51/046 |
| 2021/0409561 A1* | 12/2021 | Ikeda | G06F 3/1257 |
| 2022/0393998 A1* | 12/2022 | Tsukada | H04N 1/00212 |

\* cited by examiner

| PRINTER | ACCESS TOKEN | USER | SETTING TYPE | SETTING A | SETTING B | SETTING C | ... |
|---|---|---|---|---|---|---|---|
| PRINTER A | XXXX-YYYY-ZZZZ | USER A | 1 | OFF | ON | OFF | |
| PRINTER B | AAAA-BBBB-CCCC | USER A | 2 | OFF | OFF | — | |
| PRINTER B | AAAA-BBBB-CCCC | USER B | 2 | ON | OFF | — | |

702　　703　　704　　705

INFORMATION PROCESSING APPARATUS USING CLOUD, CONTROL METHOD THEREFOR, STORAGE MEDIUM STORING CONTROL PROGRAM THEREFOR, AND INFORMATION PROCESSING SYSTEM, THAT OBTAIN AND STORE ADDITIONAL PRINT SETTING INFORMATION NOT INCLUDED IN A TENANT SERVER THAT STORES PRINT SETTING INFORMATION

BACKGROUND OF THE INVENTION

Field of the Invention

The present invention relates to an information processing apparatus using a cloud, a control method therefor, a storage medium storing a control program, and an information processing system.

Description of the Related Art

According to the spread of clouds, operations of data and services on clouds are becoming common practices. A user becomes available to edit data and receive a service without depending on a client terminal. There are various services and applications on a cloud, such as a business chat like Microsoft Teams (registered trademark) and a similar application. In those applications, a position (group) in which messages, tools, and files are collected and shared among a team is generated. Users of the team can exchange files etc.

A business chat can cooperate with another cloud service or application. Some business chats provide a service (hereinafter referred to as a "bot" (robot)) that replies to an input in a dialogic operation. Moreover, a cooperation application can be directly used on a business chat by installing the cooperation application in the business chat.

In the meantime, according to spread of a cloud service, a service that enables a user to save an image scanned with an image processing apparatus that has a network communication function, such as a multifunction apparatus, in a cloud through the network from the image processing apparatuses is provided.

Japanese Laid-Open Patent Publication (Kokai) No. 2018-128843 (JP 2018-128843A, Counterpart of U.S. Pat. No. 10,652,178) discloses a technique that uses a business chat service as a cloud service instead of an operation unit of an image processing apparatus.

There is a message application server that operates a message application associated with arbitrary tenant information. Convenience of the message application can be improved by installing a cooperation application, which links an image processing apparatus and the message application, in the server. A print bot application is a representative example of the cooperation application. By installing the print bot application, a user's operation that instructs the image processing apparatus to print from the message application becomes easy.

However, an interface used for communication of the print bot application uses a format provided by a tenant medium in general. Accordingly, in a case where a print job is transmitted from the print bot application to an image processing apparatus, print setting supports only standard items in accordance with the above-mentioned format, which may not allow advanced setting utilizing functional characteristics of the image processing apparatus. That is, there is a problem in that unique setting information of the image processing apparatus may not be set when print is instructed from the cooperation application.

SUMMARY OF THE INVENTION

The present invention provides a technique that allows setting of unique setting information of an image processing apparatus even when print is instructed from a cooperation application.

Accordingly, an aspect of the present invention provides an information processing apparatus that is communicably connected to an image processing apparatus, a tenant server that holds machine information including first setting information about the image processing apparatus, and a user terminal. The information processing apparatus includes a message application, a cooperation application that controls the image processing apparatus to print in cooperation with the message application by using the machine information in response to a print request from the user terminal, a storage unit, a memory device that stores a set of instructions, and at least one processor that executes the set of instructions to obtain the first setting information from the image processing apparatus, store the first setting information obtained to the tenant server, obtain second setting information that is not included in the machine information from the image processing apparatus, and store the second setting information obtained to the storage unit in association with the machine information.

According to the present invention, setting of unique setting information of an image processing apparatus is allowed even when print is instructed from a cooperation application.

Further features of the present invention will become apparent from the following description of exemplary embodiments with reference to the attached drawings.

BRIEF DESCRIPTION OF THE DRAWINGS

FIG. 8 is a view showing a print information table stored in the message application server.

DESCRIPTION OF THE EMBODIMENTS

Figure 1:
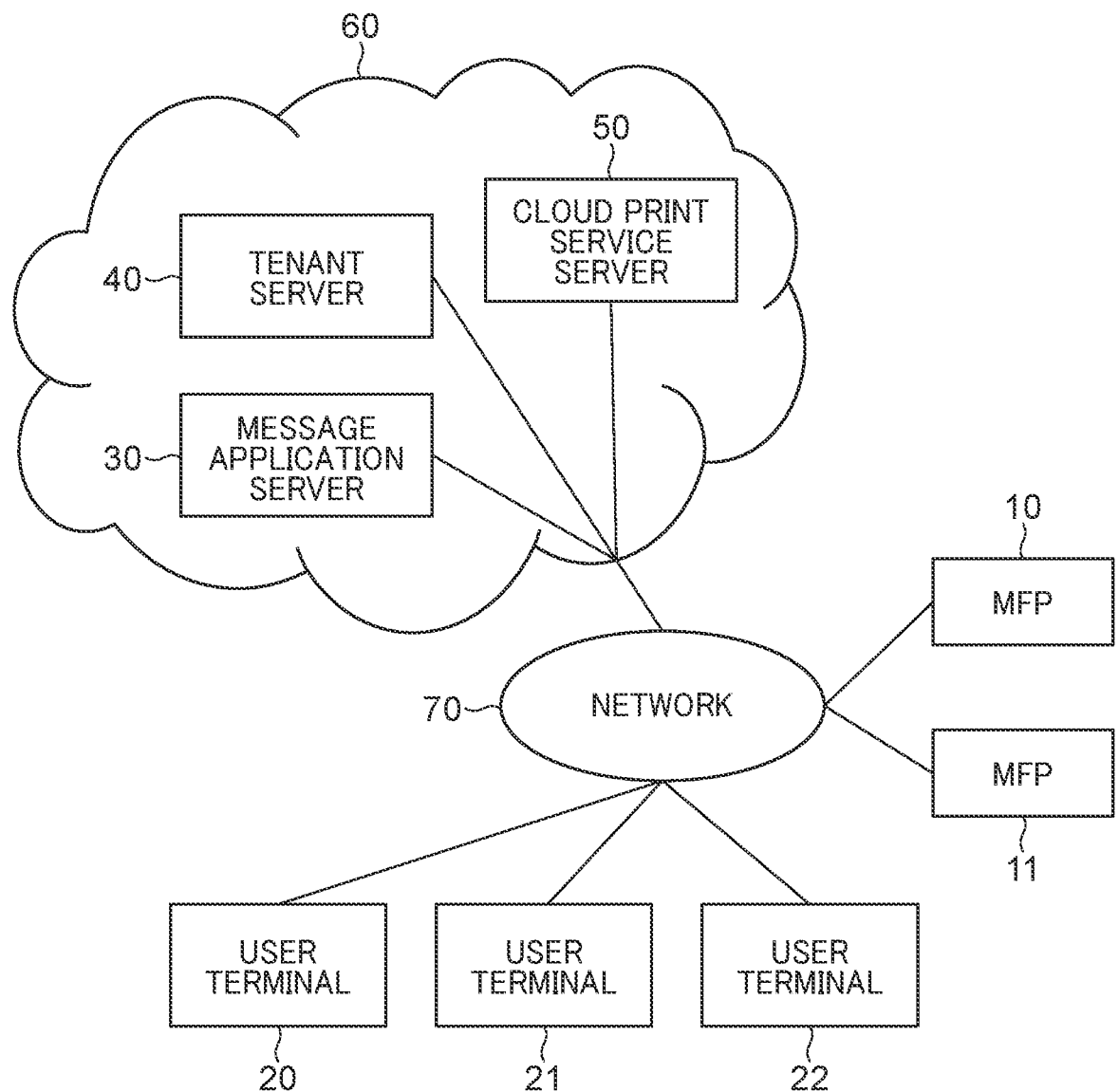
FIG. 1 is an entire configuration view showing an information processing system including an information processing apparatus according to an embodiment of the present invention.

Hereafter, embodiments according to the present invention will be described in detail by referring to the drawings.

FIG. 1 is an entire configuration view showing an image processing system including an information processing apparatus according to an embodiment of the present invention. The information processing system is an example of a system that achieves a message application service. The information processing system includes a message application server 30 as the information processing apparatus, MFPs (Multi Function Peripherals) 10 and 11 as image processing apparatuses, and user terminals 20, 21, and 22. Cloud servers constructed on a cloud 60, the MFPs 10 and 11, and the user terminals 20, 21, and 22 are connected via a network 70 so that mutual communications will be available.

The cloud servers constructed on the cloud 60 include the message application server 30, a tenant server 40, and a cloud print service server 50. Each of the MFPs 10 and 11 has a function that prints an image transmitted from the message application server 30 or a function that transmits a read image to the message application server 30. Although FIG. 1 shows an example in which the two MFPs are connected, the number of connections is one or more, and is arbitrary. Since the MFPs 10 and 11 have the same configuration, the MFP 10 will be described hereinafter.

The user terminals 20, 21, and 22 are information terminals, such as smart phones, tablet terminals, and personal computers, that are used by users of the message application service. The user terminals 20, 21, and 22 may be other apparatuses connectable to the network 70 using a Wi-Fi communication etc. Although FIG. 1 shows an example in which the three user terminals are connected, the number of connections is one or more, and is arbitrary. A user accesses the message application server 30 on the cloud 60 through the network 70 by operating one of the user terminals 20, 21, and 22 and exchanges a message with another user and instructs execution of an application installed. Since the user terminals 20, 21, and 22 have the same configuration, the user terminal 20 will be described hereinafter.

Figure 4:
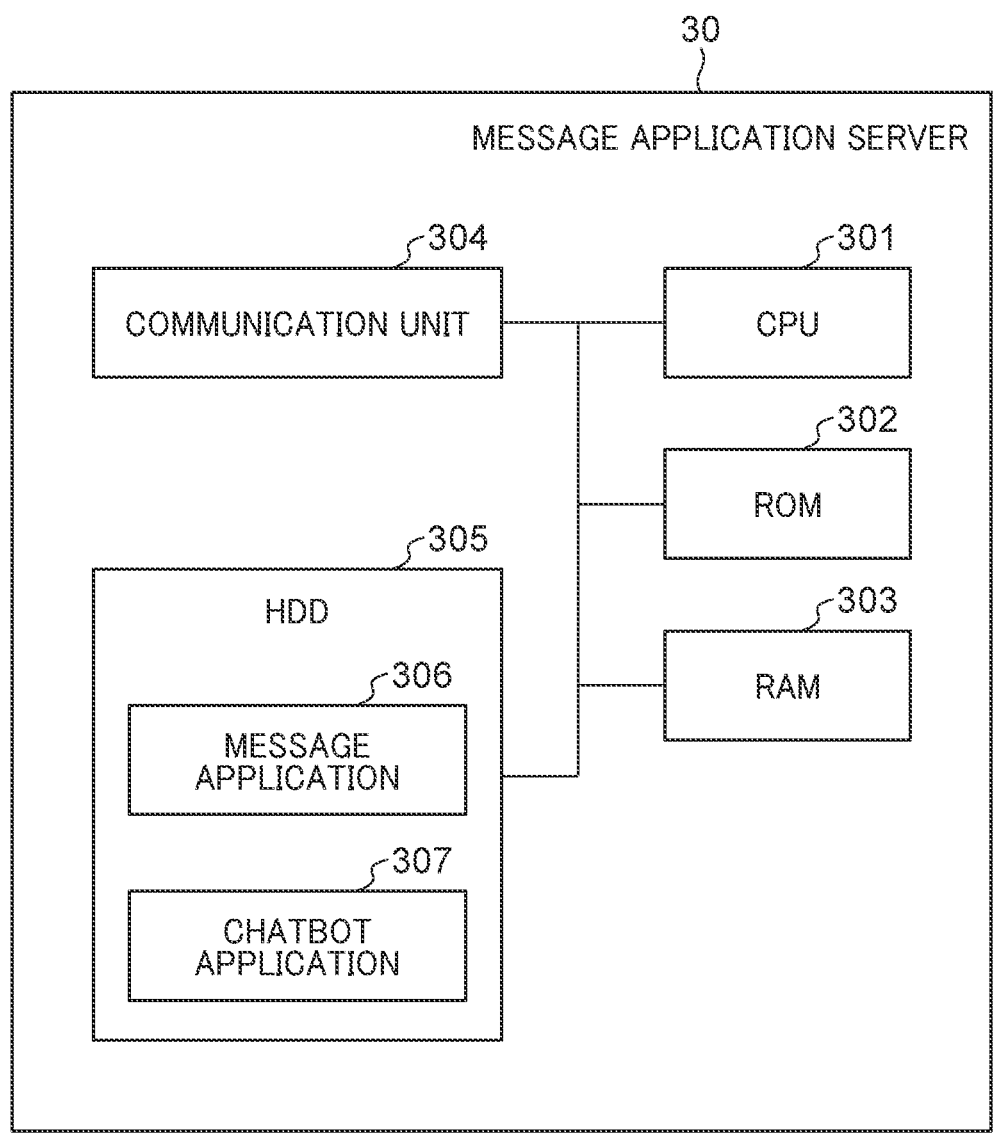
FIG. 4 is a block diagram showing an example of a hardware configuration of a message application server shown in FIG. 1.

The message application server 30 is a cloud server constructed on the cloud 60 and provides a service using a message application 306 (FIG. 4). The message application server 30 executes general processes about exchange of a message, such as a message transmission/reception process to the user terminals 20, 21, and 22 and a process to display a screen about transmission and reception of a message. A mechanism of an exchange of a message in the message application 306 will be described by referring to FIG. 8.

The tenant server 40 is a cloud server constructed on the cloud 60 and stores and provides tenant information. Details of the tenant information stored in the tenant server 40 will be described by referring to FIG. 7.

The cloud print service server 50 is a cloud server that stores event data to be transferred to the MFP 10. The cloud print service server 50 is not necessarily constructed on the cloud 60 and may be constructed outside the cloud connected to the network 70. The network 70 is a wireless or wired communication network that consists of WAN or LAN. Although the network 70 shall be a public line on the Internet in this example, it may use a dedicated line.

Figure 2:
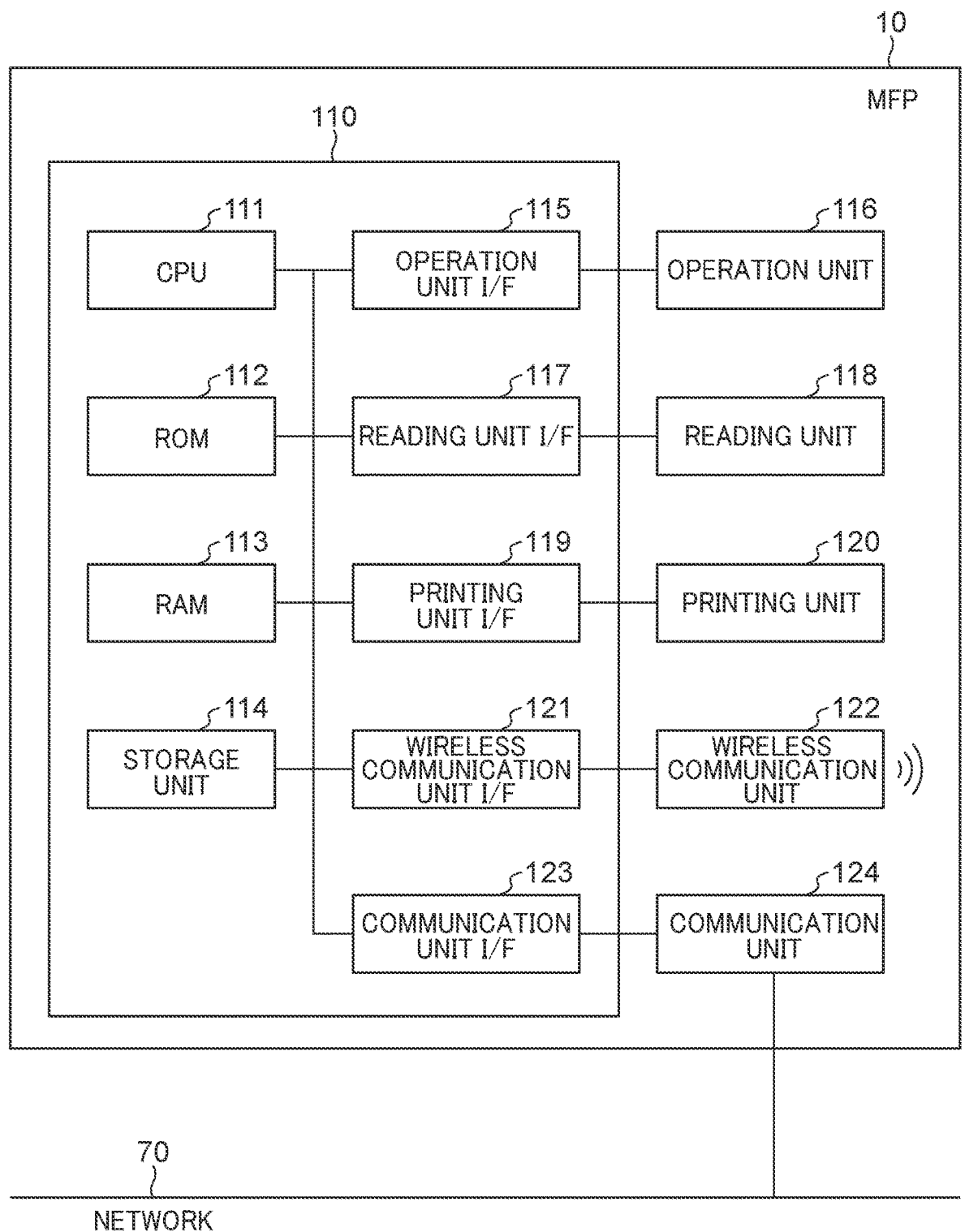
FIG. 2 is a block diagram showing a hardware configuration of an MFP shown in FIG. 1.

FIG. 2 is a block diagram showing an example of a hardware configuration of the MFP 10. The MFP 10 is provided with a controller 110, an operation unit 116, a reading unit 118, a printing unit 120, a wireless communication unit 122, and a communication unit 124. The controller 110 is provided with a CPU 111, a ROM 112, a RAM 113, a storage unit 114, an operation unit I/F 115, a reading unit I/F 117, a printing unit I/F 119, a wireless communication unit I/F 121, and a communication unit I/F 123.

The controller 110 including the CPU 111 controls entire operations of the MFP 10. The CPU 111 reads a control program stored in the ROM 112 or the storage unit 114 to the RAM 113 and performs various control processes, such as a reading control process and a printing control process. The ROM 112 stores the control program run by the CPU 111. Moreover, the ROM 112 stores a boot program, font data, etc. The RAM 113 is a main memory, provides a work area when the CPU 111 runs a program, and is used as a temporary storage area to which the various control programs stored in the ROM 112 and the storage unit 114 are developed.

The storage unit 114 stores image data, print data, various programs, various addresses, and information about various settings. A medium used as the storage unit 114 shall be an auxiliary storage device, such as a flash memory, an SSD (Solid State Drive), or an HDD (Hard Disc Drive). Moreover, an eMMC (embedded Multi Media Card) etc. may be used as the storage unit 114.

Although the MFP 10 shall execute processes shown in flowcharts mentioned later using the single CPU 111 using one memory (the RAM 113), the embodiment is not restricted to such a configuration. For example, a plurality of CPUs, RAMs ROMs, and storage units can cooperatively execute the processes. Moreover, a part of the processes may be executed using hardware circuits such as an ASIC and an FPGA.

The operation unit I/F 115 connects the operation unit 116 and the CPU 111. For example, the operation unit 116 includes a display unit like a touch panel and hard keys, displays information to a user, and detects an input from the user.

The reading unit I/F 117 connects the reading unit 118 and the CPU 111. The reading unit 118 is a scanner and reads an image of a document. The CPU 111 converts the image into image data, such as binary data. The image data generated from the image read by the reading unit 118 is transmitted to an external apparatus or is printed on a recording sheet.

The printing unit I/F 119 connects the printing unit 120 and the CPU 111. The CPU 111 transfers image data (print data) stored in the RAM 113 to the printing unit 120 through the printing unit I/F 119. The printing unit 120 is a printer and prints an image based on transferred image data on a recording sheet fed from a sheet cassette.

The wireless communication unit I/F 121 is an I/F for controlling the wireless communication unit 122. The wireless communication unit 122 connects the controller 110 and an external wireless apparatus through a wireless communication. The user terminal 20 may be used as an external wireless apparatus.

The communication unit 124 connects the controller 110 and the network 70. The communication unit I/F 123 connects the communication unit 124 and the CPU 111. The communication unit 124 transmits image data and various kinds of information inside the apparatus to an external apparatus on the network 70 and receives print data and information on the network 70 from an information processing apparatus on the network 70. A transmission/reception method through the network 70 may be a transmission/reception method using an e-mail or a method of file transmission using another protocol. The other protocol may be FTP, SMB (Server Message Block), WEBDAV (Web Distributed Authoring and Versioning), or the like, for example. Furthermore, the communication unit 124 can transmit and receive image data and various setting data through the network 70 in response to access from the user terminal 20 or the message application server 30 by an HTTP communication.

Figure 3:
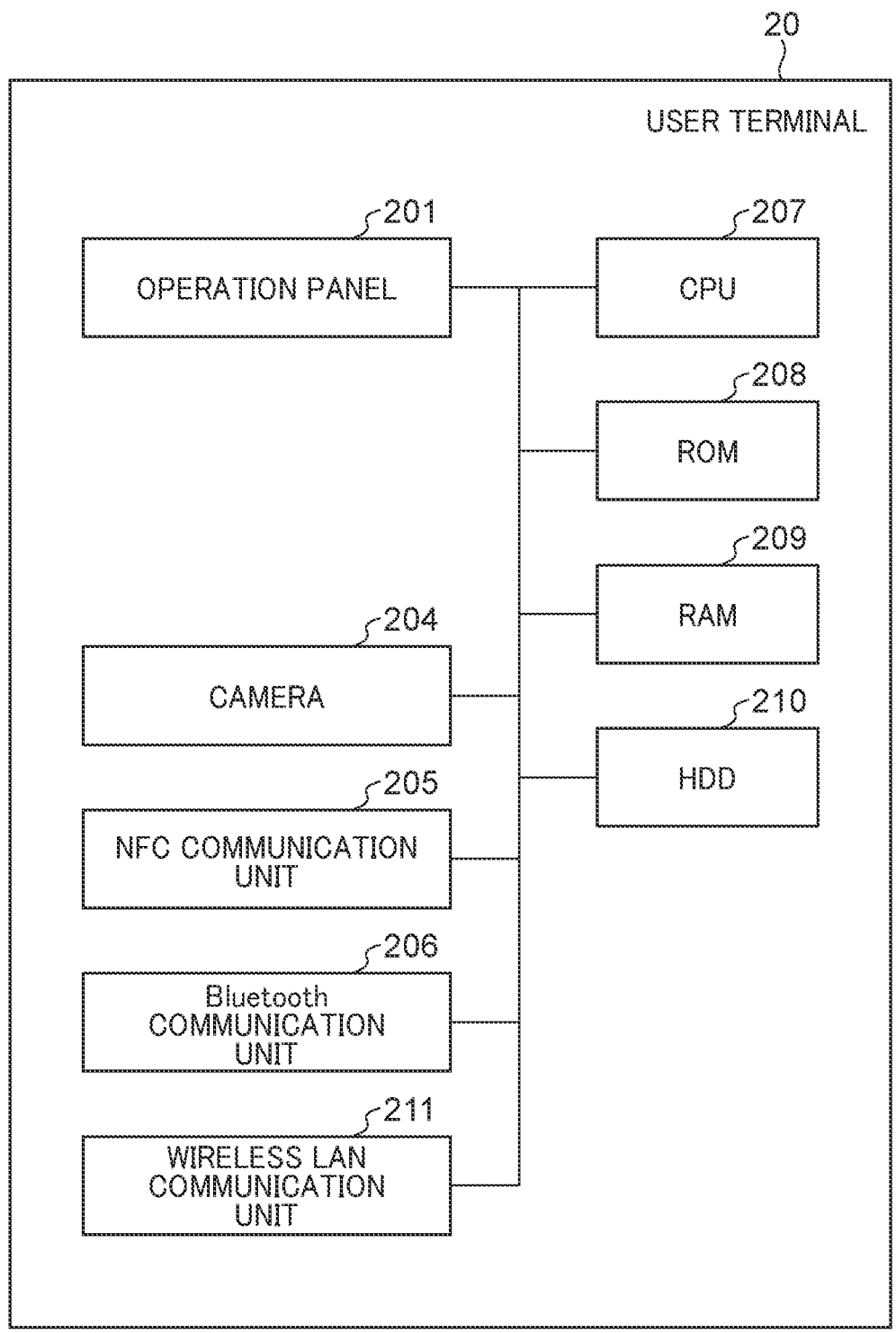
FIG. 3 is a block diagram showing a hardware configuration of a user terminal shown in FIG. 1.

FIG. 3 is a block diagram showing an example of a hardware configuration of the user terminal 20. A CPU 207 reads a control program stored in a ROM 208 and executes various processes for controlling an operation of the user terminal 20. A RAM 209 is used as a main memory of the CPU 207 and a temporary storage area like a work area. An HDD 210 stores various data, such as photos and digital documents.

An operation panel 201 is provided with a touch panel function that can detect a user's touch operation and displays various screens provided by an OS and an e-mail transmission application. Moreover, the operation panel 201 is used in order to check information stored in the message application server 30. A user can input a desired operation instruction to the user terminal 20 by a touch operation to the operation panel 201. When the user terminal 20 is provided with a hardware key (not shown), the user can input an operation instruction to the user terminal 20 using the hardware key.

A camera 204 picks up an image according to a user's imaging instruction. A photo picked up by the camera 204 is stored to a predetermined area of the HDD 210. Moreover, information can be obtained from a QR Code (a registered trademark) picked up by the camera 204 using a program that can analyze the QR Code.

The user terminal 20 can exchange data with various peripheral devices through an NFC communication unit 205, a Bluetooth (a registered trademark) communication unit 206, and a wireless LAN communication unit 211. The Bluetooth communication unit 206 may correspond to "Bluetooth Low Energy".

FIG. 4 is a block diagram showing an example of a hardware configuration of the message application server 30. A CPU 301 reads a control program stored in a ROM 302 and the message application 306 stored in an HDD 305 (a storage unit), and executes various processes for controlling operations of the message application server 30. A RAMA 303 is used as a main memory of the CPU 301 and a temporary storage area like a work area.

The HDD 305 stores various data, such as messages, images, channel information, and applications. The message application 306 and a chatbot application 307, which are installed in the HDD 305, operate on the CPU 301. The CPU 301 can exchange data with various apparatuses, such as the user terminal 20 and the MFP 10, through a communication unit 304. The communication unit 304 may perform wired communication using Ethernet (a registered trademark) or may perform wireless communication using Wi-Fi.

Figure 5:
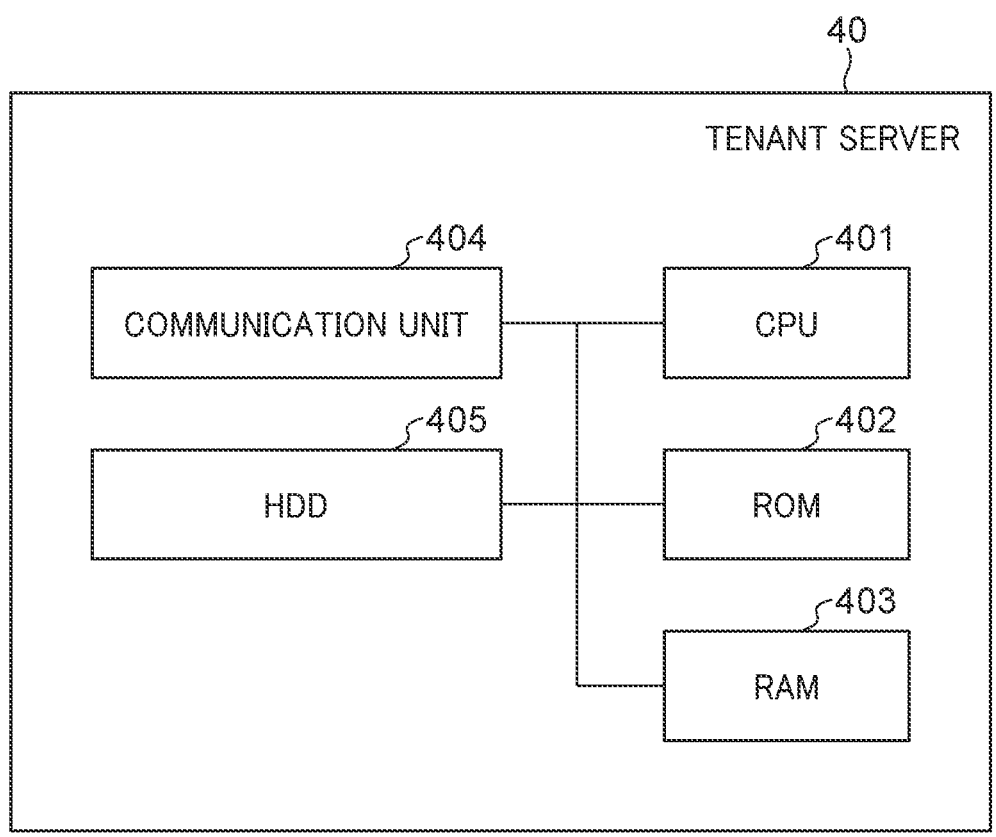
FIG. 5 is a block diagram showing a hardware configuration of a tenant server shown in FIG. 1.
Figure 7:
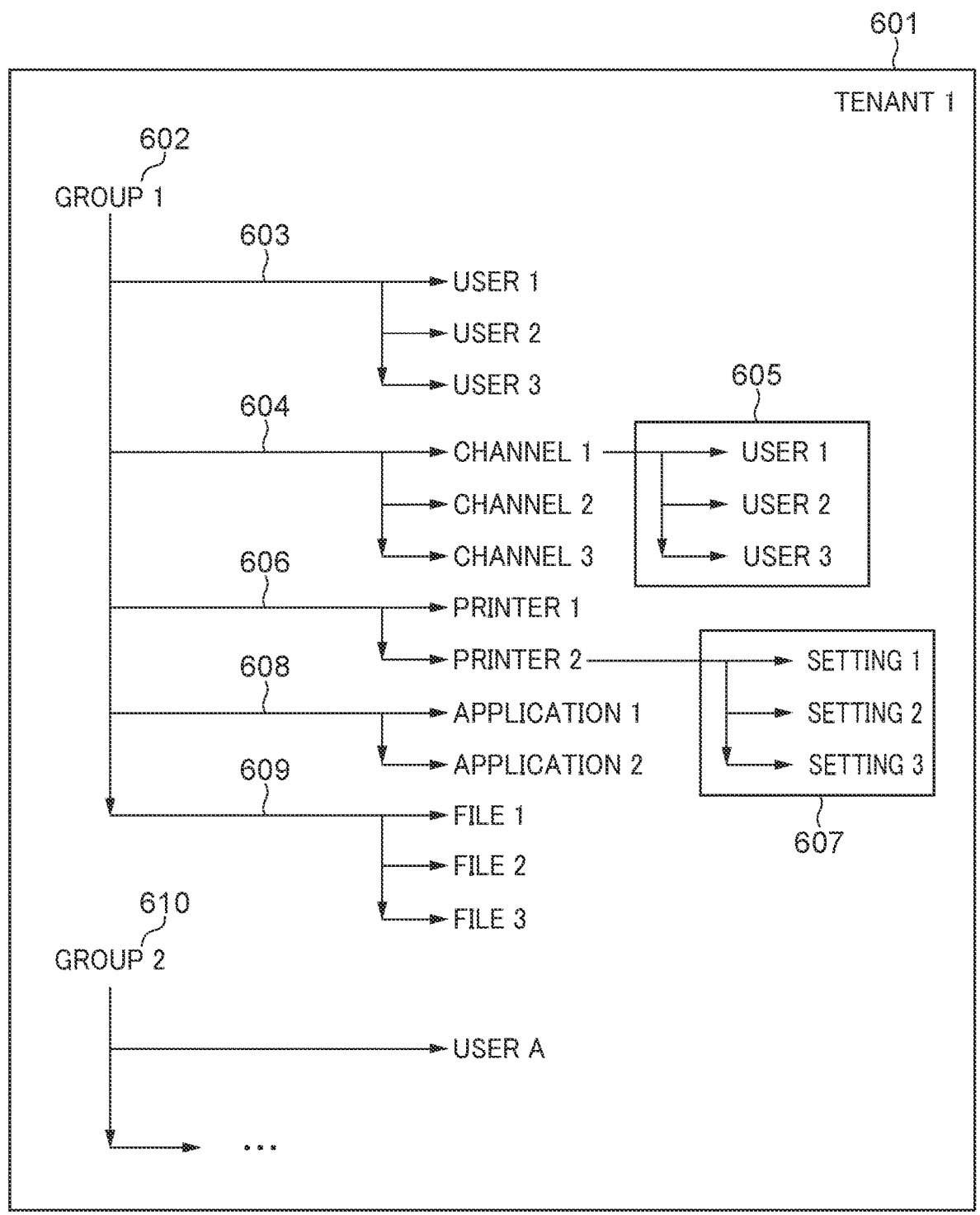
FIG. 7 is a view showing an example of tenant information stored in the tenant server.

FIG. 5 is a block diagram showing an example of a hardware configuration of the tenant server 40. A CPU 401 reads a control program stored in a ROM 402 and executes various processes for controlling tenant information 601 (FIG. 7). The tenant information 601 stored will be mentioned later. A RAM 403 is used as a main memory of the CPU 401 and a temporary storage area like a work area. An HDD 405 stores the tenant information 601 etc. The CPU 401 exchanges data with various apparatuses like the message application server 30 through a communication unit 404.

Figure 6:
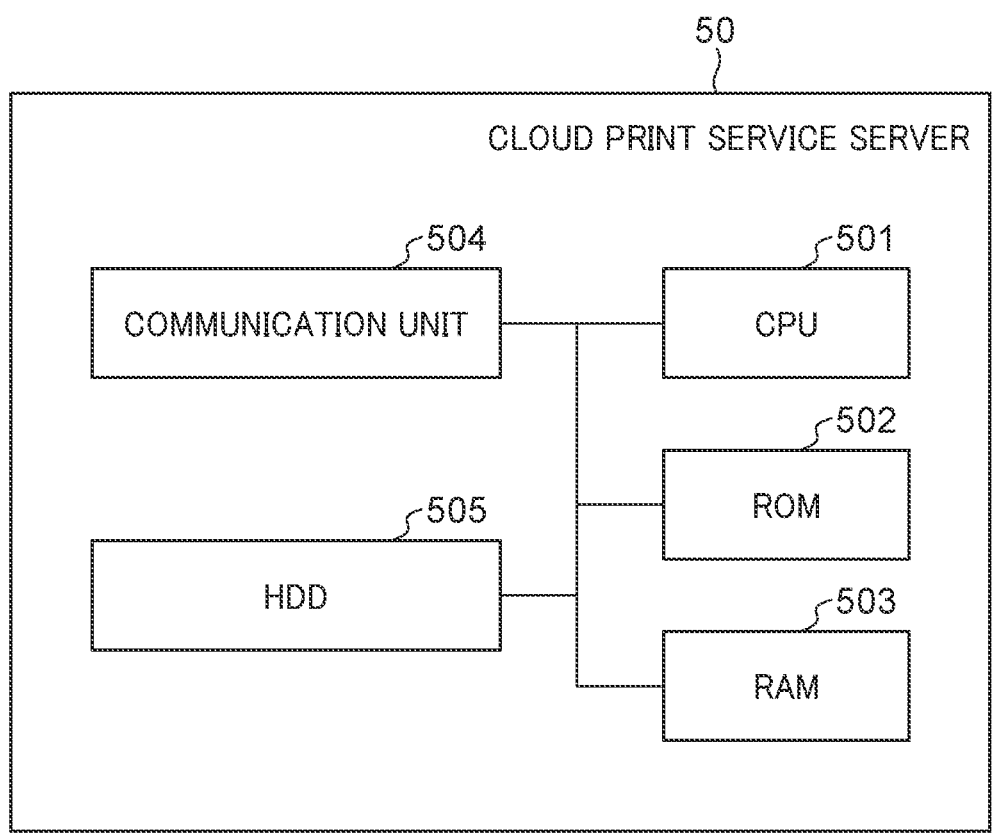
FIG. 6 is a block diagram showing an example of a hardware configuration of a cloud print service server shown in FIG. 1.

FIG. 6 is a block diagram showing an example of a hardware configuration of the cloud print service server 50. A CPU 501 reads a control program stored in a ROM 502 and executes various processes for controlling the cloud print service server 50. A RAM 503 is used as a main memory of the CPU 501 and a temporary storage area like a work area. An HDD 505 stores event data etc. that will be sent to the MFP 10. The CPU 501 can exchange data with the MFP 10, the message application server 30, etc. through a communication unit 504.

FIG. 7 is a view showing an example of the tenant information 601 stored in the HDD 405 of the tenant server 40. The tenant information 601 is held and managed by the tenant server 40. The tenant information 601 has one or more groups. There are two groups 602 and 610 in the example shown in FIG. 7. Depending on the configuration of the message application 306 (FIG. 4), only one group may be included in one piece of the tenant information. In such a case, the tenant information 601 becomes equivalent to a group.

Each of the groups 602 and 610 has information that constitutes each group. The group 602 has user information 603, channel information 604, printer information 606, cooperation application information 608, and file information 609. The user information 603 shows information about users who belong to the group. The channel information 604 is information for grouping the user information 603 and holds a list 605 that collects the user information applicable for each channel.

The printer information 606 shows machine information about the MFP 10. An application using the group 602 becomes able to send various instructions to an MFP corresponding to the printer information 606 by referring to the machine information. Moreover, each the printer information 606 has print setting information 607. Printing with a setting that a user intends becomes possible by giving the print setting information 607 to print job information.

The cooperation application information 608 is information about a cooperation application that cooperates with the message application 306 corresponding to the group 602. When the chatbot application 307 (FIG. 4) cooperates with the group 602 as the cooperation application, the information about the chatbot application 307 is stored to the cooperation application information 608.

The file information 609 is information about a file held by the group 602. A format of the file held by the group 602 is arbitrary. Various formats, such as image data, video data, and voice data, can be employed.

When a user list is referred in the message application 306 corresponding to the tenant information 601, the message application 306 refers to the group 602 that the HDD 405 of the tenant server 40 has through the communication unit 304. Thereby, the user information 603 is listed. It is similar also about the channel information 604, printer information 606, cooperation application information 608, and file information 609.

FIG. 8 is a view showing a print information table. The print information table 701 is used in the chatbot application 307 and is stored in the HDD 305 of the message application server 30. The print information table 701 includes print advanced setting information 705 and relates (associates) the printer information 606 in the tenant information 601 with the print advanced setting information 705.

The printer information 702 shows a printer and shows what the printer information 606 shows. A control access token 703 is used for accessing the printer information 606. The process that obtains the access token will be mentioned later. The user information 704 shows a user and shows what the user information 603 in the tenant information 601 shows. The user information 704 enables to hold the print advanced setting information 705 for every user to the same printer information 606.

The print advanced setting information 705 shows various advanced settings about the print. Items that can be set up by the print advanced setting information 705 are not included in the print setting information 607 of the printer information 606 and are settings about functions that may be supported by the MFP 10. That is, although the print setting information 607 (first setting information) is included in the printer information 606 that is the machine information, the print advanced setting information 705 (second setting information) is not included in the printer information 606. The print advanced setting information 705 includes a setting type column that shows a setting format of each parameter in order to cope with presence or absence of support of each setting and variation of a parameter permissible range depending on a machine (the MFP 10). Then, a parameter setting is stored for every printer information 702.

In response to a print request from the user terminal 20, the chatbot application 307 controls the MFP 10 to print in cooperation with the message application 306 using the above-mentioned machine information.

Figure 9A:
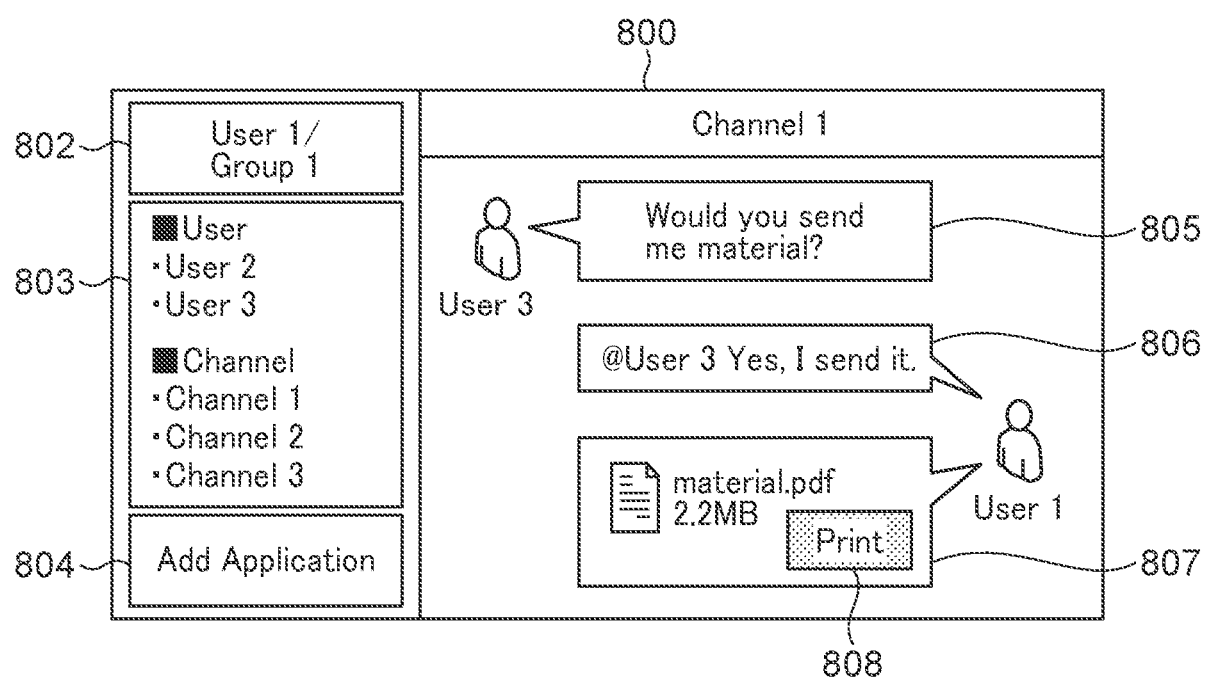
FIG. 9A, FIG. 9B, and FIG. 9C are views showing screen examples that a message application displays on a user terminal.
Figure 9B:
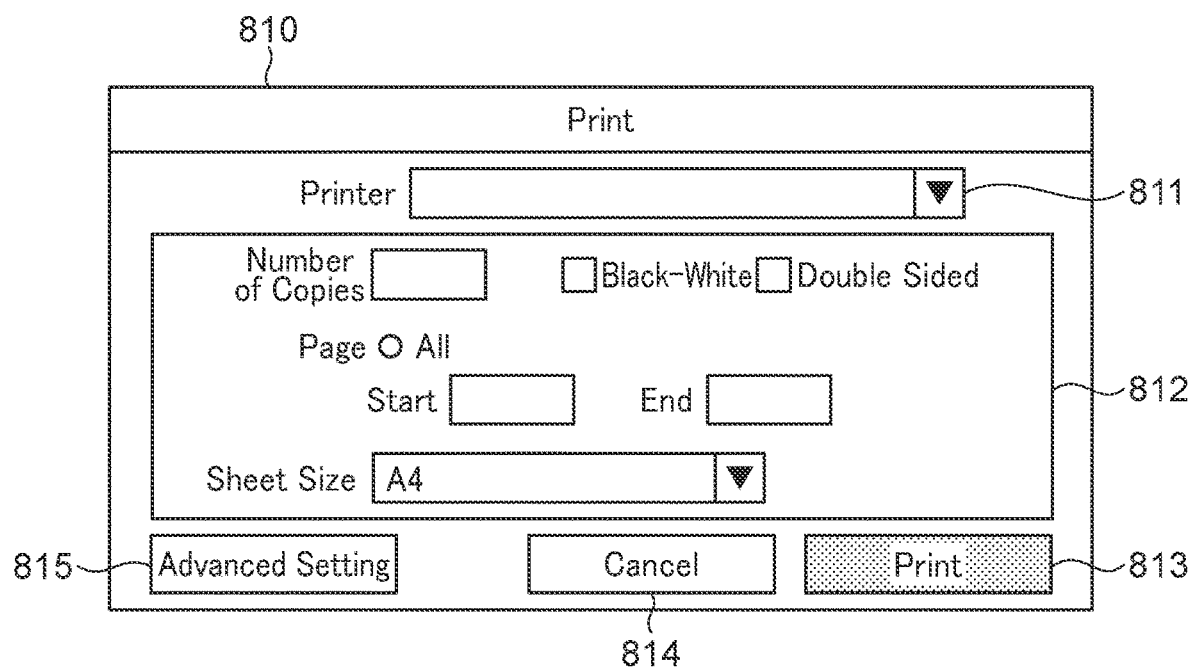
Figure 9C:
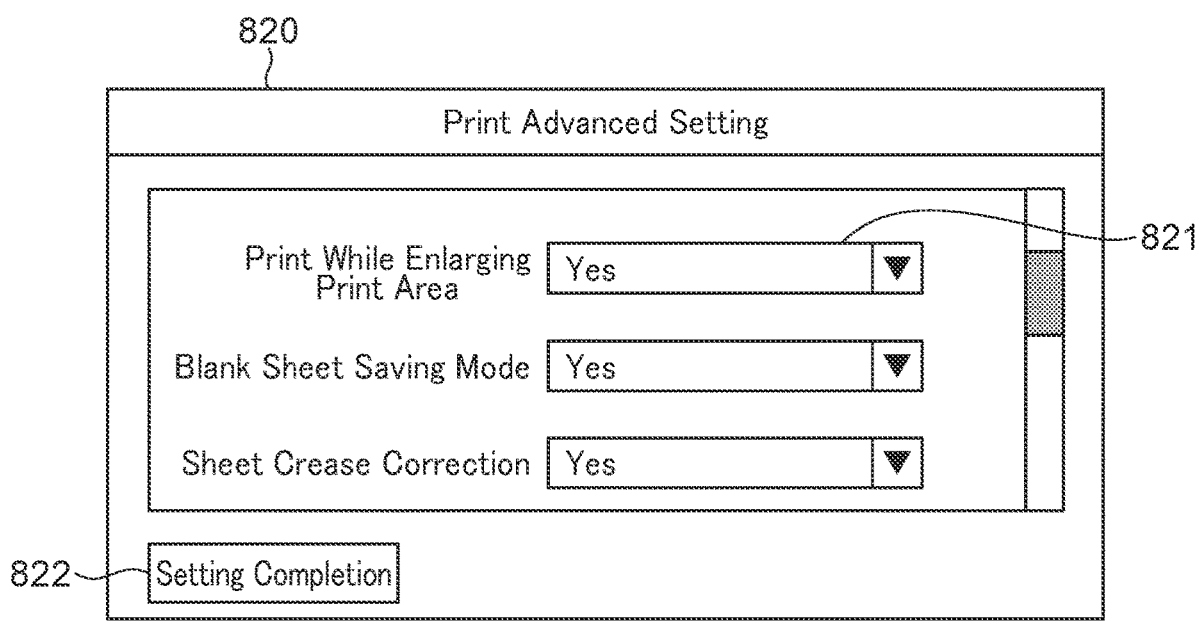

FIG. 9A through FIG. 9C are views showing screen examples that are displayed on the operation panel 201 of the user terminal 20 by the message application 306 that is cooperated with the chatbot application 307.

A screen 800 (FIG. 9A) is an example of a message screen that is displayed on the operation panel 201 of the user terminal 20 by the message application 306 corresponding to the group 602. The example in FIG. 9A shows a case where a user accesses the message application 306 associated with the group 602.

Display information 802 shows the user information 603 about the user and shows the group 602 to which the user belongs. Display information 803 shows the user information 603 about the other users in the group 602 and shows the channel information 604. The user displayed as the display information 802 becomes able to exchange a message with a selected partner by selecting an arbitrary partner from the display information 803. When the channel information 604 is selected, the user becomes able to exchange messages with all members who belong to the channel.

A button 804 is used to add a cooperation application. A push of the button 804 causes installation of a cooperation application. The embodiment is configured to install the chatbot application 307. In the meantime, it may be configured to display other cooperation applications as a list and to allow a user to select a cooperation application to be installed.

A message received from the partner (User 3) who is currently exchanging the message is displayed in a message box 805. That is, the message received from the partner who is selected from the display information 803 is displayed in the message box 805. Messages sent from the user (User 1) are displayed in message boxes 806 and 807. A message may consist of characters only as shown in the message box 806. The file information 609 may be given as a message as shown in the message box 807.

A button 808 is used to print a file corresponding to the file information 609 given to the message box 807. The button 808 is displayed because the chatbot application 307 cooperates with the message application 306. A push of the button 808 causes transition to a print screen 810 (FIG. 9B).

The print screen 810 (FIG. 9B) is used to perform print start and print setting and is displayed on the operation panel 201 of the user terminal 20. The user can designate an MFP used to print by inputting MFP information into an MFP selection item 811. Although a pulldown form is assumed as the input form, another screen may be displayed. The MFP information that can be selected in the MFP selection item 811 is obtained from the printer information 606 registered in the tenant information 601.

Print parameters can be set up in various print setting items 812. In the various print setting items 812, items corresponding to the print setting information 607 (FIG. 7) based on the format of the tenant information 601 are settable. Since the settable items and their contents depend on the print setting information 607, the contents displayed in the various print setting items 812 are updated every time the printer information 606 is selected in the MFP selection item 811.

When a print execution button 813 is pushed, a print job is transmitted to the MFP that is shown by the printer information 606 designated in the MFP selection item 811. A push of a cancel button 814 causes transition to the screen 800 that is the previous screen. A push of a detailed setting button 815 causes transition to a print advanced setting screen 820 (FIG. 9C).

The print advanced setting screen 820 (FIG. 9C) is used to perform an advanced print setting and is displayed on the operation panel 201 of the user terminal 20. Print parameters can be set up in various print advanced setting items 821. The parameters that can be set up in the various print advanced setting items 821 are included in the print advanced setting information 705 (FIG. 8) and are not included in the print setting information 607. A push of a setting completion button 822 causes transition to the print screen 810 in a state where holding the set values of the print advanced setting information 705 set up in the various print advanced setting items 821 are held.

It should be noted that the cooperation application information 608 may be displayed as the display information 803. In such a configuration, selection of the cooperation application information displayed as the display information 803 causes transition to a screen (not shown) on which a user selects a file to print, the print setting, the print advanced setting, and the machine information. When the user designates print execution on this screen, the chatbot application 307 performs the control that is the same as the control performed when the print execution button 813 is pushed.

Figure 10:
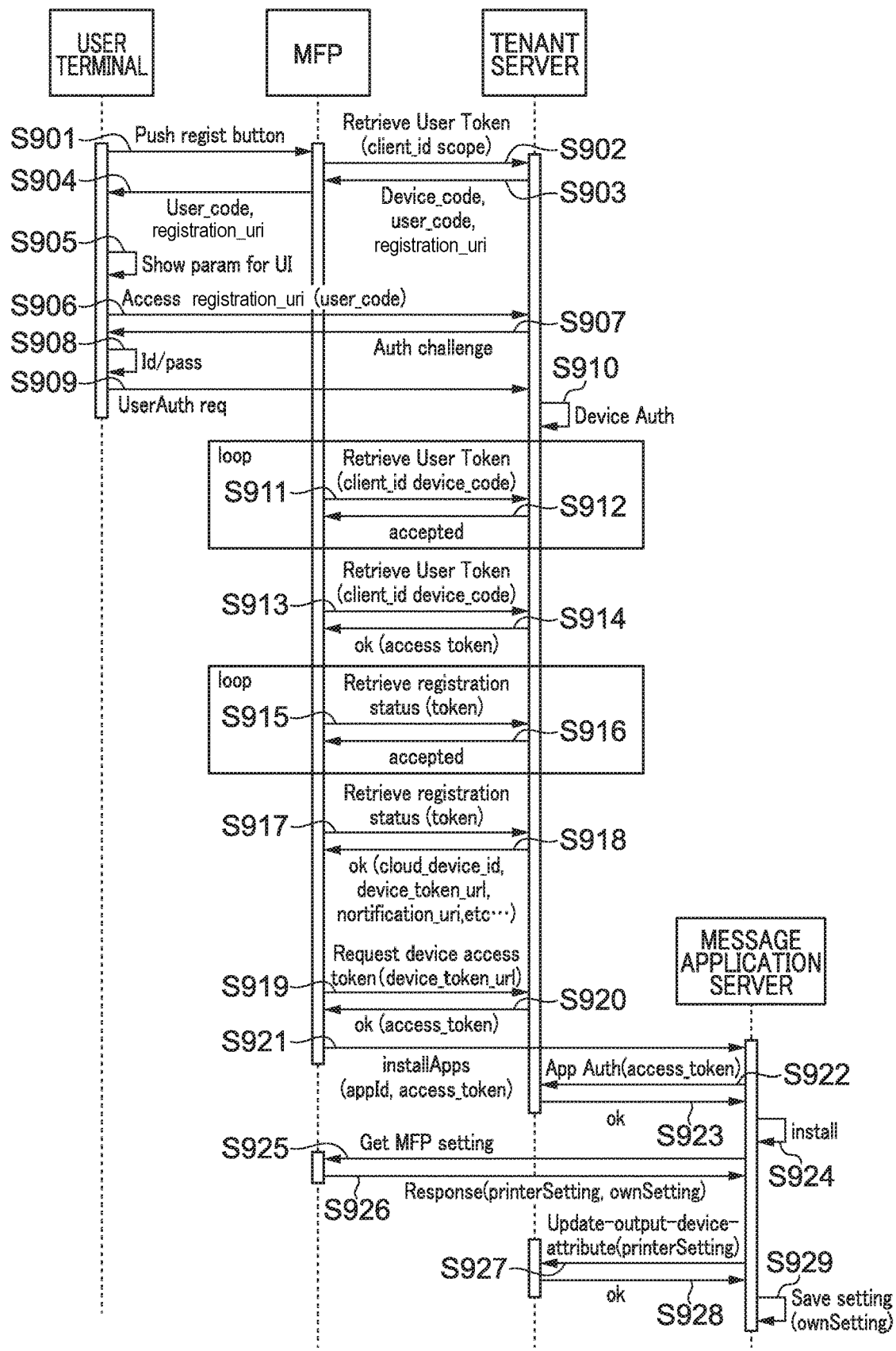
FIG. 10 is a view showing a sequence of a printer information registration process executed by the information processing system shown in FIG. 1.

FIG. 10 is a view showing a sequence of a printer information registration process. On the whole this sequence is performed as follows. The printer information 606 is registered into the tenant information 601. After that, the chatbot application 307 obtains the print advanced setting information 705. The printer information 606 is registered to the tenant information 601 held in the tenant server 40. The message application 306 associated with the group 602 to which the printer information 606 is added is installed in the message application server 30. The chatbot application 307 is installed in the message application server 30 through the network 70.

Figure 11A:
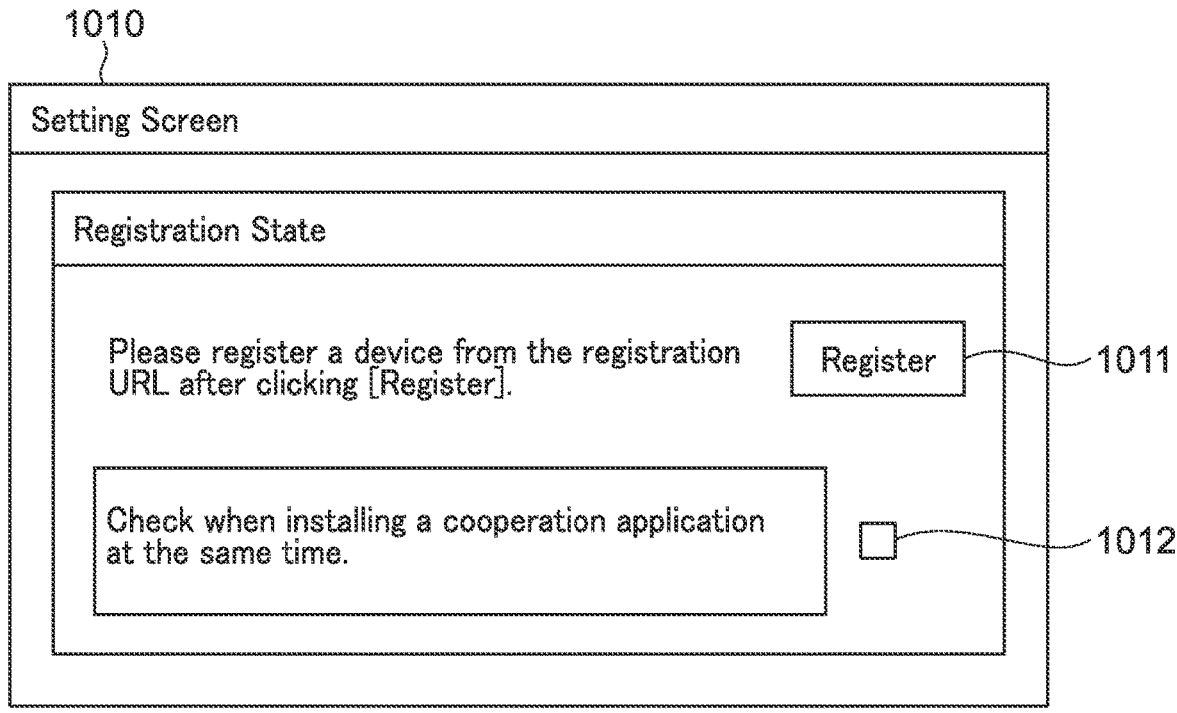
FIG. 11A and FIG. 11B are views respectively showing a tenant registration initial screen and a setting screen that are displayed on the user terminal.
Figure 11B:
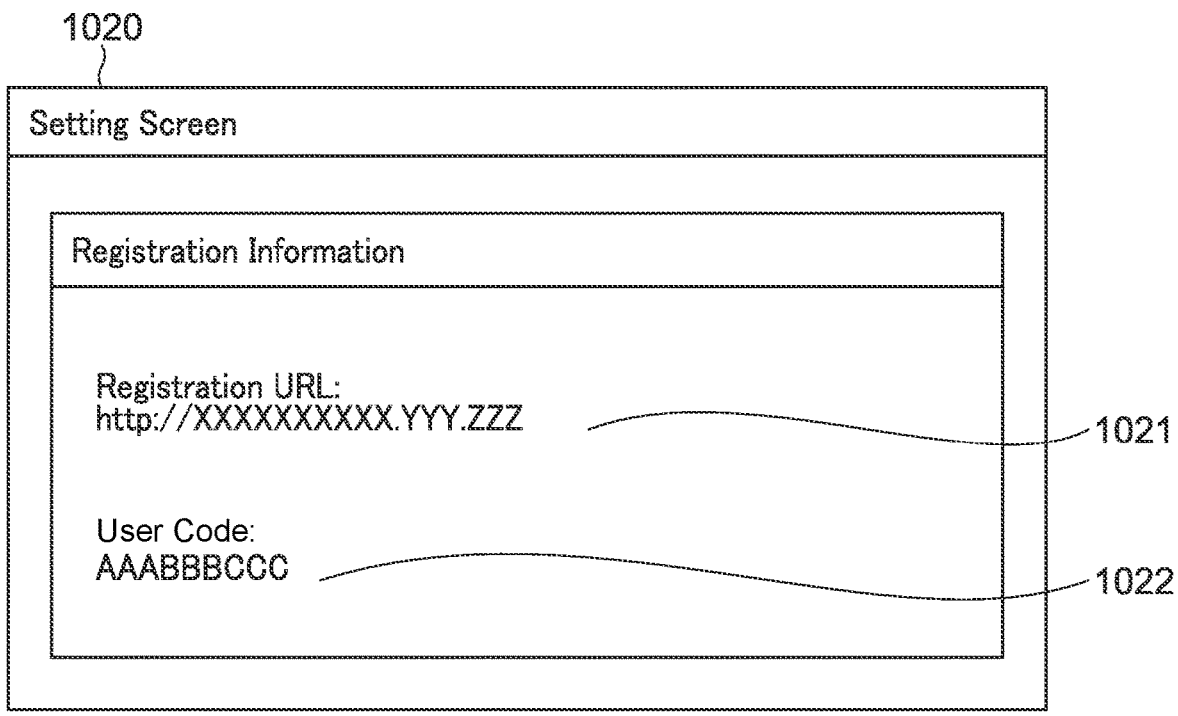

This sequence is started because the display screen on the operation panel 201 of the user terminal 20 varies to a tenant registration initial screen shown in FIG. 11A. FIG. 11A is a view showing an example of the tenant registration initial screen 1010. FIG. 11B is a view showing a setting screen 1020.

When a tenant registration button 1011 in the tenant registration initial screen 1010 (FIG. 11A) is pushed, the user terminal 20 requests tenant information registration from the MFP 10. At this time, when the tenant registration button 1011 is pushed after applying a check sign to a check box 1012, a tenant registration request and installation of the chatbot application are requested simultaneously.

In S901 in FIG. 10, the user pushes the tenant registration button 1011 displayed in the state where the check sign is applied to the check box 1012.

In the embodiment, the chatbot application 307 is obtained from the Internet through the network 70. A transmission source of data of the chatbot application 307 may be an arbitrary server on the Internet connected through the network 70 or an exclusive server provided on the cloud 60.

In S902, the MFP 10 sends a device authentication request to the tenant server 40. At this time, a client ID showing that it is a device authentication request in future requests and a scope of authentication to request are sent as additional information. There are five kinds of authentication requests in this sequence. First, the authentication requests include registering the information about the MFP 10 to the tenant server 40 as the printer information 606, changing the registered printer information, and performing image processing control using the printer information to register. Moreover, the authentication requests include installing the chatbot application 307 to the message application server 30 and changing the setting of the chatbot application 307 by the message application 306.

In S903, the tenant server 40 replies an authentication request response to the MFP 101. There are three kinds of response indications returned as the authentication request response. First, the response indications include a device code that shows future authentication request information between the MFP 10 and the tenant servers 40. Moreover, the response indications include a user code that shows authentication request information between the user terminal 20 and the tenant server 40 and a registration URI for signing in using the user code.

From S903, the MFP 10 continuously inquires of the tenant server 40 whether the device is verified using the client ID by polling (S911). Moreover, the tenant server 40 continuously returns an unissued state of the access token to the MFP 10 (S912) until the device authentication is completed in S910. Processes from S904 are performed in parallel to these processes.

In S904, the MFP 10 notifies the user terminal 20 of the user code and registration URL that are obtained in S903. In S905, the user terminal 20 displays the user code obtained in S904 in an area 1022 and displays the registration URL in an area 1021 like the setting screen 1020 shown in FIG. 11B.

Figure 12A:
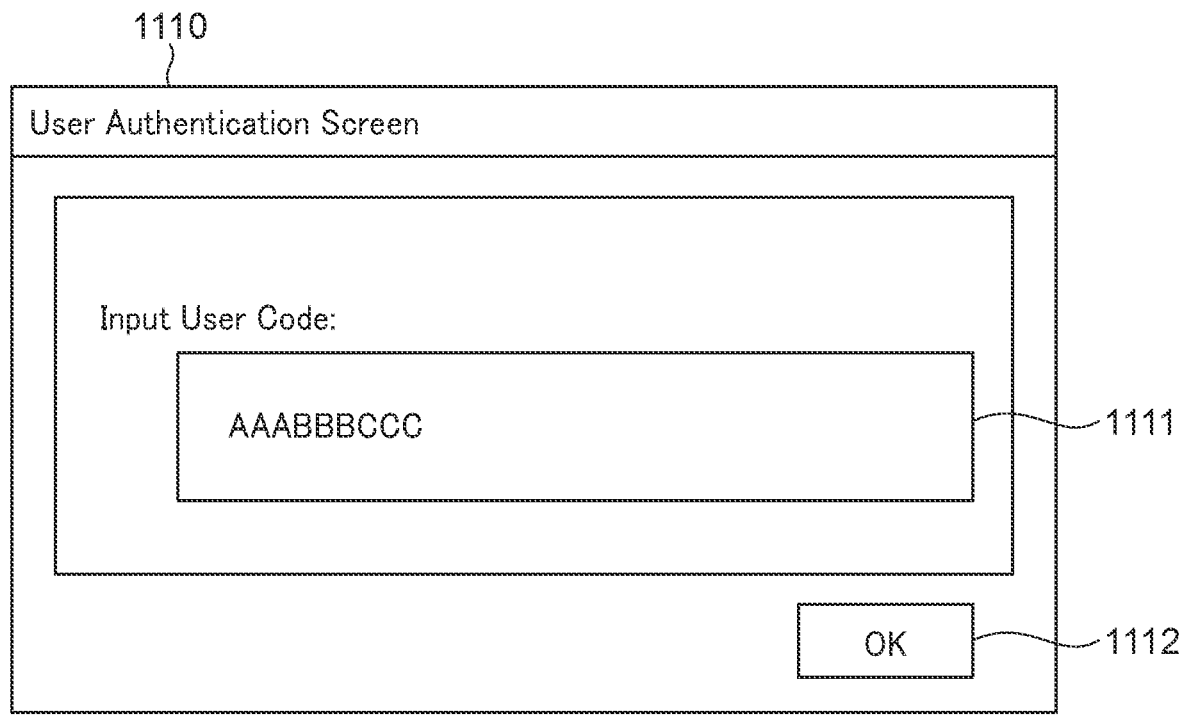
FIG. 12A and FIG. 12B are views showing authentication screens displayed on the user terminal.
Figure 12B:
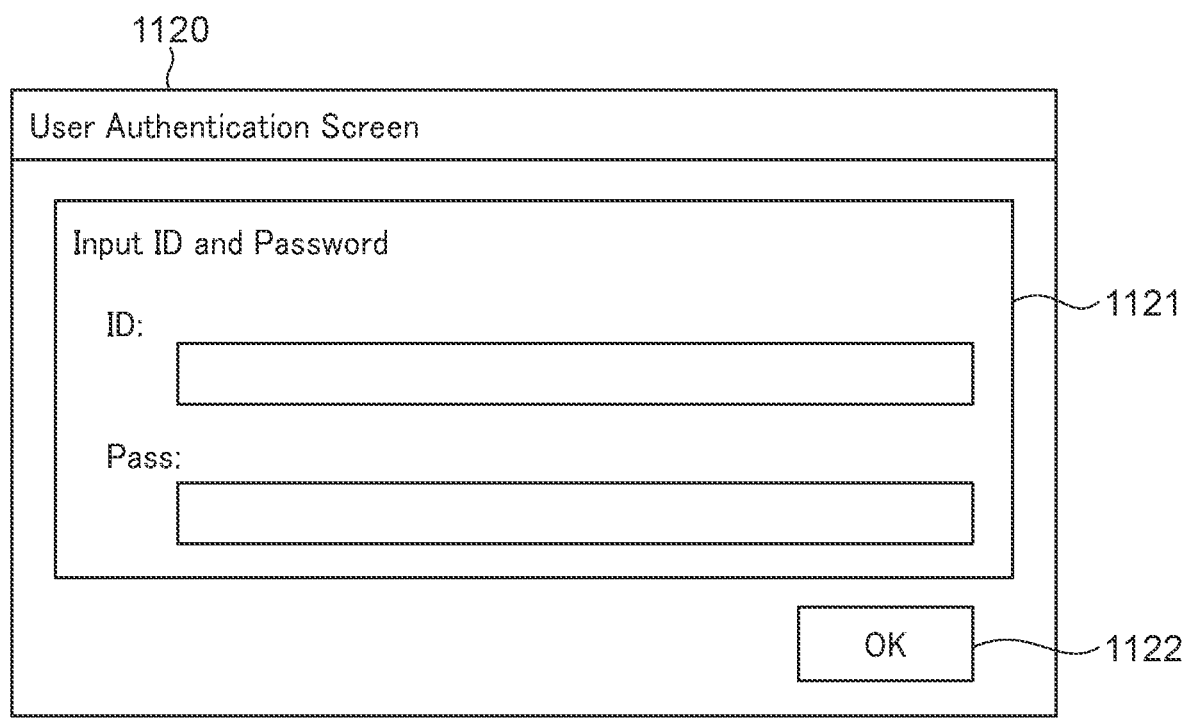

FIG. 12A and FIG. 12B are views showing authentication screens displayed on the operation panel 201 of the user terminal 20 top.

When the user accesses the registration URL displayed on the setting screen 1020 (FIG. 11B), the authentication screen 1110 (FIG. 12A) for inputting the user code is displayed. When the user inputs a user code in an area 1111 and pushes an OK button 1112, the user terminal 20 requests user authentication from the tenant server 40 in S906. Thereby, the tenant server 40 is notified of the user code.

In S907, the tenant server 40 requests the user terminal 20 to obtain information about the user authentication. In S908, the user inputs authentication information associated with user's own tenant information. That is, when the user pushes an OK button 1122 in the authentication screen 1120 (FIG. 12B) after inputting the user's authentication information, the process proceeds to S909.

In S909, the user terminal 20 sends user authentication information to the tenant server 40. In S910, the tenant server 40 performs user authentication using the user authentication information. When determining that the authenticated user information 603 has authentication right about an addition of the device information, the tenant server 40 permits the authentication of the device.

As mentioned above, a device authentication determination flow (S911 and S912) is repeated until execution of S910. A process in S913 is equivalent to the process in S911. When the authentication is completed in S910, information that shows completion of the authentication is returned as an answer corresponding to the device authentication determination (S913). That is, when the authentication process (S910) is completed, the tenant server 40 returns the authentication determination to the MFP 10 in S914. As this returned value, an authentication access token relevant to the authenticated device is returned.

A process in S915 is equivalent to a process in S917. In S915, the MFP 10 requests the registration from the tenant server 40 using the authentication access token with polling until completing the registration. If the registration is not completed, "Accepted" is returned in S916, and the process of S915 is performed again. If the registration is completed, the process proceeds to S918.

In the S918, when the registration of the device is completed (i.e., when the printer information 606 has been registered), the tenant server 40 returns "OK" to the MFP 10. At this time, a unique ID distributed to the printer, an event notification URL, and a device token obtainment URI to be accessed for a future control-access-token obtainment process are also reported.

In S919, the MFP 10 requests to obtain the control access token 703 using the device token obtainment URI obtained in S918. The authentication access token is reported as the authentication information. In S920, the tenant server 40 returns the control access token 703 to the MFP 10.

In S921, the MFP 10 requests the message application server 30 to install the chatbot application 307. At this time, the authentication access token obtained in S914 and the application ID (appId) that shows the chatbot application 307 uniquely are sent as additional information.

In S922, the message application server 30 requests, by sending the authentication access token obtained in S914, the tenant server 40 to confirm whether the authentication (Auth) of installation has been obtained. In S923, the tenant server 40 reports to the message application server 30 that it has been confirmed.

In S924, the message application server 30 connects to the network 70 through the communication unit 304, receives the data of the chatbot application 307, and installs it to the HDD 305. The data of the chatbot application 307 is received from the arbitrary server on the Internet through the network 70.

In S925, the message application server 30 requests the MFP 10 to send the device setting information. The device setting information includes the print setting information 607 and the print advanced setting information 705. In S926, the MFP 10 sends the print setting information 607 and the print advanced setting information 705 to the message application server 30. In S927, the message application server 30 sends the print setting information 607 to the tenant server 40.

In S928, the tenant server 40 stores the print setting information 607 received in S927 to the HDD 405 of the tenant server 40 in association with the printer information 606 and notifies the message application server 30 of "setting OK".

In S929, the message application server 30 creates a column equivalent to the printer information 606 in the print information table 701 stored in the HDD 305. Then, the message application server 30 stores the printer information 702, control access token 703, registered user information 704, and print advanced setting information 705 to the created column.

According to the sequence in FIG. 10, when the printer information 606 is registered to the tenant information 601 of the tenant server 40, the CPU 301 as a controller obtains the print setting information 607 from the MFP 10 and stores it to the HDD 405 of the tenant server 40. Simultaneously, the CPU 301 obtains the print advanced setting information 705 from the MFP 10 and stores it to the HDD 305 in association with the printer information 606. Moreover, when the printer information 606 is registered to the tenant server 40, the chatbot application 307 is installed in response to the request from the user terminal 20.

Figure 13:
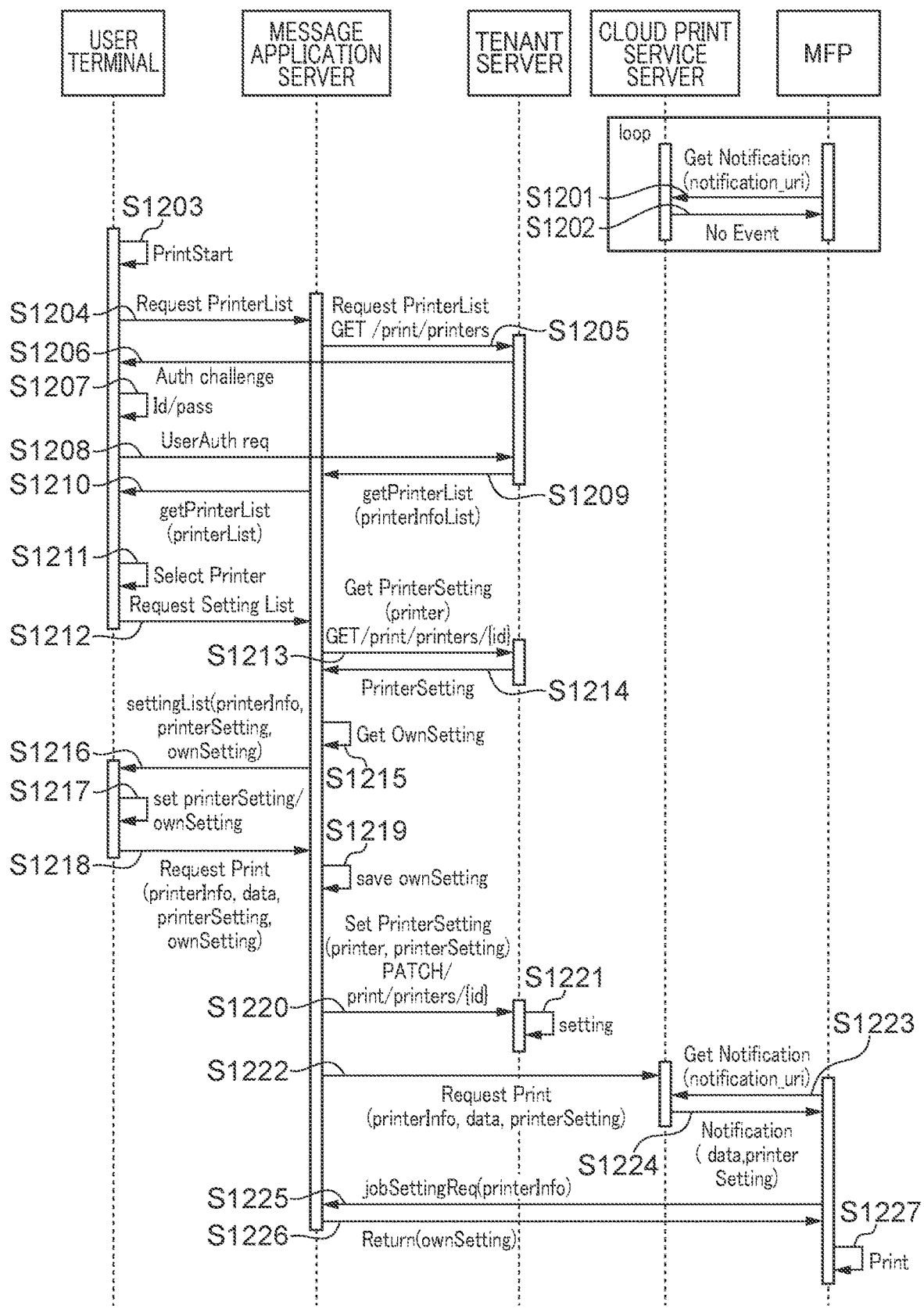
FIG. 13 is a view showing a print sequence using a chatbot application executed by the information processing system shown in FIG. 1.

FIG. 13 is a view showing a print sequence that sends a print instruction to the MFP 10 using the chatbot application 307. The chatbot application 307 has a function that requests print control by transmitting the file information 609 that is held by the tenant information 601 to the MFP 10.

In S1201, the MFP 10 sends an event getting request to the cloud print service server 50 through the event notification URL obtained in S918. When having no event to notify the MFP 10, the cloud print service server 50 notifies the MFP 10 of "no event" in S1202. S1201 and S1202 are polling operations. And the notification of "no event" continues until the cloud print service server 50 is notified of a print event in S1223.

In S1203, when the button 808 (FIG. 9A) is pushed in the state where the file information 609 is designated, the user terminal 20 performs a print start process. In S1204, the user terminal 20 requests the message application server 30 to send the list of the printer information 606 associated with the group 602.

In S1205, the message application server 30 requests the tenant server 40 to send the list of the printer information 606 associated with the group 602. This process is a process that obtains the printer information 606 that should be displayed in the MFP selection item 811 (FIG. 9B).

In S1206, the tenant server 40 requests the user terminal 20 to obtain information about the user authentication. In S1207, the user inputs authentication information associated with user's own tenant information. In S1208, the user terminal 20 sends user authentication information to the tenant server 40.

It should be noted that the user authentication process in S1206 through S1208 can be omitted when it is performed by another process. The screen 800 (FIG. 9A) is assumed that the authentication process has been already executed at the time of the start of the message application 306, and does not show an example of an authentication screen.

In S1209, the tenant server 40 performs user authentication using the user authentication information. When the authentication succeeded, the tenant server 40 retrieves the printer that can use the authenticated user information 603 from the print information table 701. Then, the tenant server 40 sends a list of the printer information 702 about the usable printer and the control access token 703 to the message application server 30.

In S1210, the message application server 30 sends the print screen 810 (FIG. 9B) in which the list of the printer information obtained in S1209 is reflected to the MFP selection item 811 to the user terminal 20. In S1211, the user terminal 20 displays the print screen 810 obtained in S1210 on the operation panel 201 (FIG. 9B). The user selects an arbitrary one of the printer information 606 in the MFP selection item 811 of the print screen 810.

In S1212, the user terminal 20 requests the print setting information 607 and the print advanced setting information 705 of the printer information 606 selected in S1211 from the message application server 30. In S1213, the message application server 30 requests the tenant server 40 to obtain the print setting information 607 of the printer information 606. At this time, the printer information 606 is also sent as additional information.

In S1214, the tenant server 40 sends the print setting information 607 associated with the printer information 606 sent in S1213 to the message application server 30. In S1215, the message application server 30 retrieves the column equivalent to the printer information 606 from its own print information table 701 and obtains the corresponding print advanced setting information 705.

In S1216, the message application server 30 updates the display contents of the various print setting items 812 in the print screen 810 using the obtained print setting information 607. Moreover, the message application server 30 updates the display contents of the various print advanced setting items 821 in the print advanced setting screen 820, which is displayed by pushing the detailed setting button 815 in the print screen 810, using the print advanced setting information 705 obtained. The message application server 30 sends the print screen 810 and the print advanced setting screen 820 that are generated in this way to the user terminal 20.

In S1217, the user terminal 20 displays the print screen 810 (FIG. 9B) obtained in S1216 on the operation panel 201. When detecting that the detailed setting button 815 is pushed, the user terminal 20 displays the print advanced setting screen 820 (FIG. 9C) obtained in S1216 on the operation panel 201. The user can change the parameters (set values) of the print setting information 607 or the print advanced setting information 705 into arbitrary values.

In S1218, the user terminal 20 requests the message application server 30 to print. This process is executed at a timing when the print execution button 813 was pushed. The printer information 606 that is selected in S1211 and the print setting information 607 and print advanced setting information 705 that are set up in S1217 are added as the parameters in this process, and are sent to the message application server 30.

In S1219, the message application server 30 stores the print advanced setting information 705 of the printer information 606 received in S1218. In this way, the print advanced setting information 705 set up at this time can be taken over to the next print.

In S1220, the message application server 30 sends the print setting information 607 of the printer information 606 received in S1218 to the tenant server 40. In S1221, the tenant server 40 stores the print setting information 607 received in S1220. In this way, the print setting information 607 set up at this time can be taken over to the next print.

In S1222, the message application server 30 notifies the cloud print service server 50 of the print event. At this time, the printer information 606, the file information 609, and the print setting information 607 are also sent as the additional information.

A process in S1223 is equivalent to the process in S1201. The MFP 10 sends the event getting request to the cloud print service server 50 through the event notification URL obtained in S918. Since the cloud print service server 50 has the print event received in S1222 in S1223, the print event (including the additional information) is sent in S1224.

In S1225, the MFP 10 requests the print advanced setting information 705 from the message application server 30. In S1226, the message application server 30 sends the print advanced setting information 705 obtained in S1218 to the MFP 10. In S1227, the MFP 10 starts the print control of the file information 609 using the print setting information 607 and the print advanced setting information 705 that are obtained.

The cloud print service server 50 may not support the print advanced setting information 705. However, even in such a case, the print advanced setting information 705 can be reflected to a print result when the print request is sent to the MFP 10 from the chatbot application 307 by constructing as above.

According to the embodiment, the tenant server 40 holds the tenant information 601 including the printer information 606 (machine information). The printer information 606 includes the print setting information 607 (first setting information) of the MFP 10 and does not include the print advanced setting information 705 (second setting information). When registering the printer information 606 to the tenant server 40, the message application server 30 obtains the print setting information 607 from the MFP 10 and stores it to the tenant server 40 (S926 and S927). Moreover, the message application server 30 obtains the print advanced setting information 705 from the MFP 10 and stores it to the HDD 305 in association with the printer information 606 (S926 and S929).

Even when print is instructed from the chatbot application 307 that is the cooperation application, the unique setting information of the MFP to be used can be set up.

Moreover, the message application server 30 transmits the information about the screens (810 and 820), which are used to set up the set values of the print setting information 607 and the set values of the print advanced setting information 705, to the user terminal 20 in response to the request from the user terminal 20 (S1216). Thereby, the setting items of the MFP to be used can be displayed on the user terminal.

Moreover, when the set value of the print setting information 607 is changed in the user terminal 20, the message application server 30 obtains the changed print setting information 607 from the user terminal 20 and sends it to the tenant server 40. A storage content of the tenant server is updated by the changed print setting information 607 (S1219). Furthermore, when the set value of the print advanced setting information 705 is changed in the user terminal 20, the message application server 30 obtains the changed print advanced setting information 705 from the user terminal 20. Then, the message application server 30 updates a storage content of the HDD 305 with the obtained print advanced setting information 705 concerned (S1220 and S1221). In this way, the changed setting values of the print setting information 607 and the print advanced setting information 705 can be taken over to the next print.

Moreover, when receiving the print job to which the print setting information 607 and the print advanced setting information 705 are associated from the user terminal 20, the message application server 30 transmits the print setting information 607 and the print advanced setting information 705 to the MFP 10. Thereby, even in a case where the cloud print service server 50 does not support the print advanced setting information 705, the print advanced setting information 705 can be reflected to a print result.

The print advanced setting information 705 is directly transmitted to the MFP 10, and the print setting information 607 is indirectly transmitted to the MFP 10 through the cloud print service server 50 (S1222 through S1226). However, the embodiment is not limited to this. The print setting information 607 and the print advanced setting information 705 may be transmitted to the MFP 10 directly or indirectly.

For example, the system may be configured so that the chatbot application 307 will directly transmit the print command to the MFP 10 without passing through the cloud print service server 50. Moreover, at least one of the print setting information 607 and the print advanced setting information 705 may be transmitted to the MFP 10 through the cloud print service server 50. Accordingly, the system may be configured so that the chatbot application 307 will send the print advanced setting information 705 to the MFP 10 through the cloud print service server 50.

Although the present invention has been described in detail on the basis of the suitable embodiments, the present invention is not limited to these specific embodiments, and various configurations that do not deviate from the scope of the present invention are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140061, filed Aug. 30, 2021, which is hereby incorporated by reference herein in its entirety.

What is claimed is:

1. An information processing apparatus communicable with an image processing apparatus, a tenant server that holds machine information including first setting information about the image processing apparatus, and a user terminal, the information processing apparatus comprising:
   a message application;
   a cooperation application that controls the image processing apparatus to print in cooperation with the message application using the machine information in response to a print request from the user terminal;
   a storage unit;
   a memory device storing instructions; and
   at least one processor that executes the instructions to:
      obtain the first setting information from the image processing apparatus;
      store the obtained first setting information to the tenant server;
      obtain second setting information not included in the machine information from the image processing apparatus; and
      store the obtained second setting information to the storage unit in association with the machine information.

2. The information processing apparatus according to claim 1, wherein the at least one processor executes the instructions to send the information about a screen, which is used to set up a set value of the first setting information and a set value of the second setting information, to the user terminal.

3. The information processing apparatus according to claim 2, wherein the at least one processor executes the instructions to:
   obtain, in a state where the set value of the first setting information is changed in the user terminal, the changed first setting information;
   send the obtained changed first setting information to the tenant server to update a storage content of the tenant server with the obtained changed first setting information;
   obtain, in a state where the set value of the second setting information is changed in the user terminal, the changed second setting information; and
   update a storage content of the storage unit with the obtained changed second setting information.

4. The information processing apparatus according to claim 1, wherein the at least one processor stores the obtained first setting information to the tenant server and to store the obtained second setting information to the storage unit, in a state where the machine information is registered to the tenant server.

5. The information processing apparatus according to claim 4, wherein the at least one processor executes the instructions to install the cooperation application in response to a request from the user terminal, in the state where the machine information is registered to the tenant server.

6. The information processing apparatus according to claim 1, wherein the at least one processor executes the instructions to send the first setting information and the second setting information to the image processing apparatus in response to reception of a print job to which the first setting information and the second setting information are associated.

7. The information processing apparatus according to claim 6, wherein the at least one processor executes the instructions to send at least one of the first setting information or the second setting information to the image processing apparatus through a cloud print service server.

8. A control method for an information processing apparatus communicable with an image processing apparatus, a tenant server that holds machine information including first information about the image processing apparatus, and a user terminal, and that includes a message application and a storage unit, the control method comprising:
   obtaining the first setting information from the image processing apparatus, in a state where the machine information is registered to the tenant server;
   storing the obtained first information to the tenant server;
   obtaining second setting information not included in the machine information, from the image processing apparatus, in the state where the machine information is registered to the tenant server;
   storing the obtained second setting information to the storage unit in association with the machine information; and
   controlling the image processing apparatus to print in cooperation with the message application using the machine information in response to a print request from the user terminal.

9. A non-transitory computer-readable storage medium storing a control program executable by a computer to execute a control method for an information processing apparatus communicable with an image processing apparatus, a tenant server that holds machine information including first information about the image processing apparatus, and a user terminal, and that includes a message application and a storage unit, the control method comprising:
   obtaining the first setting information from the image processing apparatus, in a state where the machine information is registered to the tenant server;
   storing the obtained first information to the tenant server;
   obtaining second setting information not included in the machine information, from the image processing apparatus, in the state where the machine information is registered to the tenant server;
   storing the obtained second setting information to the storage unit in association with the machine information; and
   controlling the image processing apparatus to print in cooperation with the message application using the machine information in response to a print request from the user terminal.

10. The non-transitory computer-readable storage medium according to claim 9, wherein the control method further comprises sending the information about a screen, which is used to set up a set value of the first setting information and a set value of the second setting information, to the user terminal.

11. The non-transitory computer-readable storage medium according to claim 10, wherein the control method further comprises:
   obtaining, in a state where the set value of the first setting information is changed in the user terminal, the changed first setting information;
   sending the obtained changed first setting information to the tenant server to update a storage content of the tenant server with the changed first setting information;
   obtaining, in a state where the set value of the second setting information is changed in the user terminal, the changed second setting information; and
   updating a storage content of the storage unit with the obtained changed second setting information.

12. The non-transitory computer-readable storage medium according to claim 9, wherein the control method further comprises storing the obtained first setting information to the tenant server and to store the obtained second setting information to the storage unit, in a state where the machine information is registered to the tenant server.

13. The non-transitory computer-readable storage medium according to claim 12, wherein the control method further comprises installing the cooperation application in response to a request from the user terminal, in the state where the machine information is registered to the tenant server.

14. The non-transitory computer-readable storage medium according to claim 9, wherein the control method further comprises sending the first setting information and the second setting information to the image processing apparatus in response to reception of a print job to which the first setting information and the second setting information are associated.

15. The non-transitory computer-readable storage medium according to claim 14, wherein the control method further comprises sending at least one of the first setting information or the second setting information to the image processing apparatus through a cloud print service server.

16. An information processing system comprising:

an image processing apparatus;

a tenant server configured to hold machine information including first setting information about the image processing apparatus;

a user terminal; and an information processing apparatus configured to communicate with the image processing apparatus, the tenant server, and the user terminal, the information processing apparatus comprising:

a message application;

a cooperation application configured to control the image processing apparatus to print in cooperation with the message application using the machine information in response to a print request from the user terminal;

a storage unit;

a memory device storing instructions; and at least one processor that executes the instructions to:

obtain the first setting information from the image processing apparatus;

store the obtained first setting information to the tenant server;

obtain second setting information not included in the machine information from the image processing apparatus; and store the obtained second setting information obtained to the storage unit in association with the machine information.

\* \* \* \* \*